Nov. 4, 1958 C. F. PALUKA 2,859,338
SQUELCH SYSTEM FOR FREQUENCY MODULATION RECEIVER
Filed June 1, 1954
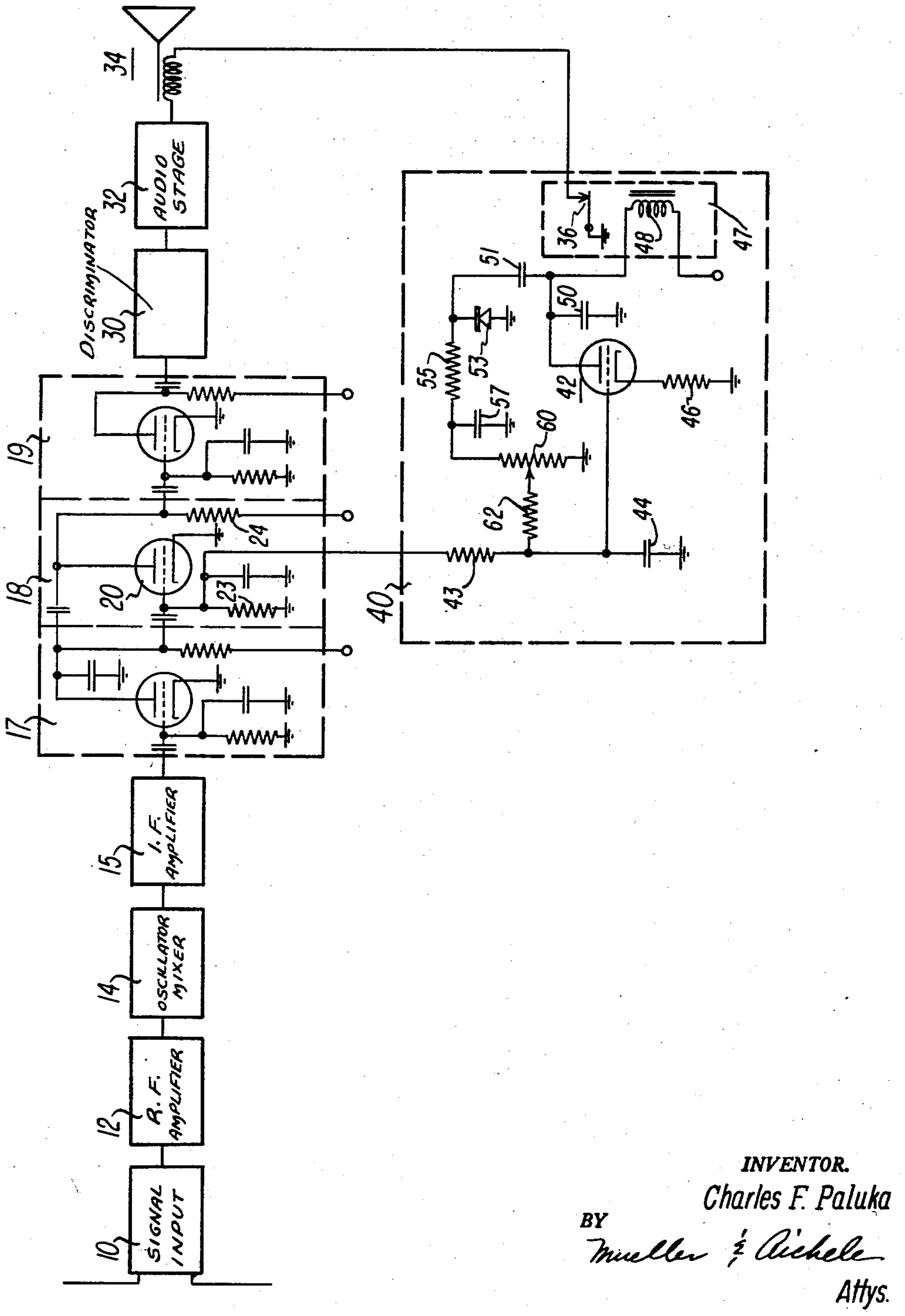
INVENTOR.
Charles F. Paluka
BY Mueller & Aichele
Attys.

United States Patent Office 2,859,338

Patented Nov. 4, 1958

2,859,338

SQUELCH SYSTEM FOR FREQUENCY MODULATION RECEIVER

Charles F. Paluka, Lombard, Ill., assignor to Motorola, Inc., Chicago, Ill., a corporation of Illinois Application June 1, 1954, Serial No. 433,555

6 Claims. (Cl. 250—20)

This invention relates generally to radio receivers and more particularly to squelch circuits for silencing such receivers during periods when no desired signal is being received.

It is common practice in the present communication receivers to provide a squelch circuit which disables a portion of the receiver during periods when no desired signal is being receved. In the case of voice reception this, of course, relieves the operator of the discomfort of listening to noise at such times and in the case of radio control equipment a receiver disabling circuit prevents accidental response of the controlled equipment by the disturbances occurring when there is no control signal. Although such circuits are useful in many applications, two important applications are in V. H. F. receivers used for two-way mobile communications, and in subcarrier receivers used in multiplex microwave communication systems.

Various circuits have been developed for the above described purpose and some of these have been effective to provide silencing when no signal is being received even in the presence of high noise levels and to render the receiver operative when a signal is received under such conditions. However, systems which have the desired response and sensitivity necessary in some applications have required complicated circuitry including a large number of electronic components, with the accompanying disadvantages of increased cost, high maintenance and greater space requirements.

Therefore it is an object of the present invention to provide an improved squelch circuit having a simple circuit which is inexpensive to construct.

Another object of the invention is to provide an improved squelch circuit for radio receiving apparatus which provides efficient action so that noise levels of varying degrees will not trigger the squelch circuit and render the receiver responsive at undesired times.

Still another object is to provide an improved squelch circuit for a radio receiver which has sufficient sensitivity to respond to desired signals of low level but will not respond to high level noise components.

A feature of the present invention is the provision of an improved squelch circuit for a radio receiver having a control valve which is coupled to the receiver limiter to be biased to one condition by a potential developed from reception of a desired signal and biased to another condition when noise signal components are amplified therein, detected, and re-applied thereto as a bias.

Another feature of the invention is the provision of a squelch control circuit for a radio receiver including an electron valve to which noise signal components are applied in the absence of a desired signal, and to which a bias is applied from the limiter stage of the receiver in the presence of a signal, with the noise signal components being amplified in the valve, applied through a suitable filter to a rectifier, and re-applied after rectification to the valve as a bias to oppose any bias coupled thereto from the limiter stage due to the presence of such noise signal.

Further objects, features and the attending advantages thereof will be apparent upon consideration of the following description when taken in conjunction with the accompanying drawing in which the figure is a schematic representation of radio receiving apparatus incorporating the squelch circuit of the present invention.

According to the present invention, radio receiving apparatus is provided having a highly sensitive squelch circuit to cut off the reproducer of the receiver when no signals are received. This circuit is coupled to the input electrode of a limiter stage in the receiver from which noise signal components may be obtained as well as a negative bias voltage produced by detection of the desired signal and corresponding to the level thereof. The squelch valve is used to amplify the noise signal components after which they are selected and rectified by a diode to provide a second positive bias, with said first and second biases being applied to the input of this valve in a differential manner. Accordingly, conduction of the valve is governed by the difference in the biases produced by noise and the desired signal, with the first bias overcoming the second bias when a desired signal is received to cut off the squelch valve so that signals are reproduced. Control means is employed in the output of the squelch valve to render the receiver operative or inoperative at the proper times.

A portion of the radio receiving apparatus in the schematic diagram is of conventional type and includes a source of signals 10 which is coupled to the radio frequency amplifier 12 in which received signals are selected and amplified. The signals then are applied to the mixer oscillator 14 where they may be heterodyned to produce an intermediate frequency signal which is applied to intermediate frequency amplifier 15 for further amplification and selection. The signal from the output of this amplifier is applied to the first of three limiter stages 17, 18 and 19. These stages serve the function of removing amplitude variations of the received frequency modulated signal.

Stage 18, typical of the three limiter stages, includes electron discharge valve 20 to the grid of which is applied the signal from limiter stage 17 across resistor 23. Plate potential is supplied to discharge valve 20 through resistor 24, and the output signal is also developed across this resistor. The circuit elements of this stage are selected, as is customary in such limiters, so that signals impressed thereon cause grid current to flow with the result that a negative direct current potential of a value proportional to the signal strength appears across resistor 23.

A signal from the third limiter 19 is applied to the discriminator 30 where it is detected and coupled to the audio stage 32 for further amplification. The signal may then be applied to reproducing device 34 which is responsive to a signal applied thereto when the switch 36 is in a closed position.

Considering now the squelch circuit 40, it may be noted that the grid of the squelch valve 42 is coupled to the grid of valve 20 in the second limiter stage 18 through resistor 43. The resistor 43, in conjunction with capacitor 44 which is coupled from the grid of the squelch valve to ground, serves to filter radio frequency signals which may be conducted by this network. The result then is that at the grid of valve 42 there will appear a negative direct current potential which is proportional to the signal as previously described in the operation of limiter stage 18. The noise signal components in the second limiter stage 18 will appear across resistor 23 due to the detector action of the grid circuit of valve 20 and will be coupled through resistor 43 to the grid of the squelch valve 42. The level of the noise components will be greater when the desired signal is not received and will be reduced when the desired signal is received by action of the prior limiter stage.

The squelch valve 42 is provided with a cathode bias resistor 46 and the plate supply for this valve is applied through an associated control device 47 such as relay coil 48 which is associated with the switch 36 so that when valve 42 is conducting, the switch 36 is opened thereby silencing the reproducing device 34. It is to be pointed out that any suitable control device may be operated by valve 42 in place of coil 48. Noise signal components supplied to the valve 42 as previously described are generally of frequencies above that of the normal voice range so that capacitors 50 and 51 may be of the proper values to apply these noise signals existing at the plate of the valve 42 across the diode 53. The noise signal components will then be rectified in this diode and applied to the resistor-condenser combination 55, 57 for filtering. The filtered output of rectifier 53 is then applied across resistor 60 and will have a positive D. C. value at any point along resistor 60 with respect to ground.

Resistor 60 has a tap point thereon which may be a movable tap so that a portion of the positive voltage thus developed may be coupled to the grid of valve 42 through resistor 62. Therefore, it may be seen that in the absence of a signal the noise components existing in the receiver will be applied to valve 42 and amplified therein after which they will be detected and applied back to the input of this valve as a positive bias therefor. This causes the valve to conduct through control device 47 which energizes relay coil 48 thereby opening switch 36 to silence the reproducing device during such a period. By tapping off a selected amount of this positive feedback voltage from resistor 60, a desired point of operation for valve 42 may be selected.

When a desired signal is received in the system, there will be developed a voltage across resistor 23 and the limiter stage 18 which is proportional to the signal strength and which is negative with respect to ground due to the detector action occurring in the grid circuit of valve 20. This is applied to the grid of squelch valve 42 and tends to cut off this valve. It is noteworthy that during signal reception periods the actual noise coupled to the valve 42 will be somewhat reduced due to the limiting action of the limiters 17 and 18. Also, certain frequency modulated signals are accompanied by small amplitude variations which may be of lower frequency than the frequencies of the noise signal components. Therefore, at this time the positive feedback voltage across the resistor 60 will be insufficient to oppose the negative bias coupled thereto so that valve 42 will remain cut off and switch 36 will be closed.

The following values for the components shown in the drawing have been found to provide satisfactory operation in a subcarrier receiver operating in the frequency range from 400 to 800 kilocycles with an intermediate frequency of 150 kilocycles:

| | |
|---|---|
| Valve **20** | ½ 12 AT 7. |
| Resistor **23** | 430,000 ohms. |
| Valve **42** | ½ 12 AT 7. |
| Resistor **43** | 390,000 ohms. |
| Capacitor **44** | 100 micromicrofarads. |
| Resistor **46** | 100 ohms. |
| Capacitor **50** | .001 microfarad. |
| Capacitor **51** | .005 microfarad. |
| Diode **53** | CR 5. |
| Resistor **55** | 100,000 ohms. |
| Capacitor **57** | .005 microfarad. |
| Resistor **60** | 1 megohm. |
| Resistor **62** | 470,000 ohms. |

In a circuit of this type it is possible to produce considerable difference in the potentials produced by the desired signal and the undesired noise so that there will be positive action of the squelch valve 42. The use of the squelch control valve to amplify the noise signals as well as to control the squelch relay coil 48 is an important item in the improved result. Thus a simple and very effective squelch circuit is provided for the associated radio apparatus.

While a particular embodiment of the invention has been shown and described, it is understood that changes may be made which are within the scope of the invention and it is intended in the appended claims to cover all such changes and modifications.

What is claimed is:

1. In a wave signal receiving apparatus of the type for reception of frequency modulated signals and having a limiter for translating the received signals and removing amplitude variations therefrom, which limiter includes a valve having a grid at which appear noise components and a direct current potential related to the strength of a desired signal, the squelch circuit including in combination, a second electron valve having input and output electrodes, a circuit connecting the grid of the limiter valve to said input electrode of said second valve and providing a direct current connection therebetween for applying the noise components and the direct current potential from the limiter valve to said input electrode of said second valve with the direct current potential providing a first bias for said valve, filler means coupled to said output electrode of said second valve for selecting noise components amplified therein, and rectifier means connected between said filler means and said input electrode of said second valve to provide a second bias therefor of opposite polarity to said first bias and which varies with the amplitude of said noise components, said second electron valve being rendered conductive when said first bias has a predetermined value with respect to said second bias and being rendered non-conductive when said first bias has a lesser value with respect to said second bias, with the conductivity thereof indicating the reception of a desired signal.

2. Wave signal receiving apparatus adapted to receive frequency modulated signals, including in combination, a limiter stage for translating the received signals and removing amplitude variations therefrom, and at which appear noise signal components and a direct current potential related to the strength of a desired signal, an electron valve having input and output electrodes, a direct current circuit connecting the limiter stage to said input electrode and applying thereto the direct current potential related to a desired signal as a first bias for said discharge valve, said circuit also applying said noise signal components to said input electrode, filter means coupled to said output electrode of said valve for selecting noise signal components amplified therein, rectifier means connected between said filter means and said input electrode to provide a second bias therefor of opposite polarity to said first bias and which varies with the amplitude of said noise signal components, control means coupled to said output electrode and operated thereby, and reproducing means coupled to said control means, said electron discharge valve being rendered conductive to operate said control means when said first bias has a predetermined value with respect to said second bias and being rendered non-conductive when said first bias has a lesser value with respect to said second bias.

3. In radio receiving apparatus including translation circuit means to translate selected signals and which also produces noise components, wherein the translation circuit means includes means translating the received signals which produces noise components and a direct current potential proportional to a selected signal, the squelch control circuit including in combination, an electron valve having control and output elements, circuit means connecting the translating circuit means to said control element of said valve and providing a direct current connection therebetween for applying the noise components to said squelch valve and to couple the direct current potential as a first bias thereto, circuit means coupled between said output and input elements of said squelch electron discharge valve to apply a differential second bias to said input element, said circuit means including means to select noise components and rectifier means to produce a direct current bias therefrom, whereby said squelch control circuit is operated by conduction of said valve when said second bias is greater than said first bias and unoperated by non-conduction of said valve when said first bias is greater than said second.

4. In carrier wave receiving apparatus including translation circuit means for selected frequency modulated carrier waves and an output device therefor, with said translation circuit means including a limiter stage translating received signals and removing amplitude modulation from signals passing therethrough, and in which noise is produced and applied with signals to the output device, a squelch circuit for controlling the operation of the output device including in combination, an electron valve with an output electrode and a control electrode, means connecting the limiter stage of the translation circuit means to said control electrode and providing a direct current connection therebetween for applying to said control electrode noise components appearing as amplitude modulation of the signals and a direct current bias varying with the strength of a selected carrier wave developed by the limiter stage, circuit means connected to said output electrode of said valve for selecting amplified noise components therein and producing a control voltage therefrom, and means for applying said noise produced control voltage to said control electrode in opposition to said bias, whereby the conductivity of said valve is controlled by said bias and said control voltage, and means coupled to said output electrodes of said valve for controlling the operation of the output device in acordance with the conductivity of said valve.

5. Wave signal receiving apparatus including in combination, translation circuit means capable of translating frequency modulated waves and which also produces noise components, an output device, a limiter stage translating received signals and removing amplitude modulation from the signals, a discriminator coupled to said limiter stage for deriving the frequency modulation from the received signal, an output circuit coupled to said discriminator for utilizing derived signals, a squelch circuit for controlling the operation of the output device, and including an electron discharge valve with an output electrode and a control electrode and in which the current flow in said output electrode is controlled by the voltage applied to said control electrode, circuit means coupled to said limiter stage for deriving therefrom noise components appearing as amplitude modulation of a carrier wave and a direct current bias varying with the strength of a frequency modulated carrier wave, said circuit means having a portion connected to said control electrode of said valve and providing a direct current connection for applying said noise components and said bias to said control electrode, filter means and rectifier means connected to said output electrode of said valve for selecting amplified noise components therein and producing a control voltage therefrom, and means for applying said noise produced control voltage to said control electrode in opposition to said bias, whereby the conductivtiy of said valve is controlled by said bias and said control voltage, and further means coupled to said output electrode of said valve for controlling the operation of said output circuit in accordance with the conductivity of said valve.

6. Wave signal receiving apparatus of the type for reproducing frequency modulated carrier wave signals and which also produces noise signals, such apparatus including in combination, limiter means for translating the received signals and removing amplitude variations therefrom, said limiter means including a tube having a grid which develops noise signals and a first potential related to the strength of a receiver carrier wave signal, utilization circuit means coupled to said limiter means for deriving the frequency modulation from the received carrier wave and for translating the same, a squelch electron discharge valve with input and output electrodes, direct current means connecting said input electrode to said amplitude detecting means for application of said potential and noise signals to said input electrode, filter and rectifier means coupled between said output electrode and said input electrode of said discharge valve for selecting and rectifying noise signals at said output electrode and applying to said input electrode a second potential varying with the amplitude of said noise signals as a bias opposing said first potential, whereby the conductivity of said valve is controlled by said first and second potentials, and control means connected to said valve for interrupting said utilization circuit means in accordance with conduction or non-conduction thereof.

References Cited in the file of this patent

UNITED STATES PATENTS

| | | |
|---|---|---|
| 2,509,381 | Werner et al. | May 30, 1950 |
| 2,527,617 | Berger | Oct. 31, 1950 |
| 2,588,031 | O'Brien et al. | Mar. 4, 1952 |
| 2,617,019 | Hepp | Nov. 4, 1952 |
| 2,679,000 | Reynolds | May 18, 1954 |
| 2,719,221 | Dammers | Sept. 27, 1955 |
| 2,751,493 | Hargrove | June 19, 1956 |

OTHER REFERENCES

Langford-Smith: Radiotron Designer's Handbook 4th ed. (U. S.) Feb., 1954, Fig. 27.46(A), (B) and (C), pps. 1128–9 relied on.